United States Patent [19]
Yasuoka

[11] Patent Number: 5,967,114
[45] Date of Patent: Oct. 19, 1999

[54] IN-CYLINDER DIRECT-INJECTION SPARK-IGNITION ENGINE

[75] Inventor: Masayuki Yasuoka, Yokohama, Japan

[73] Assignee: Nissan Motor Co., Ltd., Yokohama, Japan

[21] Appl. No.: 09/116,542

[22] Filed: Jul. 16, 1998

[30] Foreign Application Priority Data

Jul. 23, 1997 [JP] Japan .................................. 9-196695

[51] Int. Cl.⁶ .................................................. F02B 17/00
[52] U.S. Cl. ............................................................ 123/295
[58] Field of Search ............................................ 123/295

[56] References Cited

U.S. PATENT DOCUMENTS

| | | | |
|---|---|---|---|
| 5,088,456 | 2/1992 | Suga .................................... | 123/90.17 |
| 5,322,044 | 6/1994 | Maebashi ................................ | 123/305 |
| 5,727,528 | 3/1998 | Hori et al. .............................. | 123/486 |
| 5,749,346 | 5/1998 | Halvorson et al. ..................... | 123/486 |
| 5,797,367 | 8/1998 | Iida et al. ................................ | 123/305 |

FOREIGN PATENT DOCUMENTS

4-183945  6/1992  Japan .

*Primary Examiner*—John Kwon
*Attorney, Agent, or Firm*—Foley & Lardner

[57] ABSTRACT

An in-cylinder direct-injection spark-ignition engine using at least a homogeneous combustion mode where early fuel-injection on intake stroke produces a homogeneous air-fuel mixture and a stratified combustion mode where late fuel-injection on compression stroke produces a stratified air-fuel mixture, comprises a variable valve overlap device mounted on at least one of intake and exhaust valves for variably adjusting a valve overlap during which open periods of the intake and exhaust valves are overlapped, and a control unit connected to a fuel injector for switching between the homogeneous combustion mode and the stratified combustion mode, and also connected to the variable valve overlap device for switching between a first valve overlap suitable for the homogeneous combustion mode and a second valve overlap suitable for the stratified combustion mode. The control unit comprises an overlap switch timing control section for optimizing a switch timing of the valve overlap, so that a first timing of switching from the first valve overlap to the second valve overlap is different from a second timing of switching from the second valve overlap to the first valve overlap.

17 Claims, 9 Drawing Sheets

SWITCHING FROM HOMOGENEOUS TO STRATIFIED

FIG.7A tTe

FIG.7B FSTR1

FIG.7C FSTR2

FIG.7D tOVL

FIG.7E rOVL

TIME

SWITCHING FROM LEAN STRATIFIED
VIA HOMOGENEOUS LEAN
TO HOMOGENEOUS STOICHIOMETRIC

FIG.10A tTe

FIG.10B FSTR1

FIG.10C FLEAN

FIG.10D FSTR2

FIG.10E tOVL

FIG.10F rOVL

FIG.10G TFBYA

TIME

IN-CYLINDER DIRECT-INJECTION SPARK-IGNITION ENGINE

The contents of Application No. TOKUGANHEI 9-196695, filed Jul. 23, 1997, in Japan is hereby incorporated by reference.

BACKGROUND OF THE INVENTION

1. Field of the Invention

The present invention relates to an in-cylinder direct-injection spark-ignition engine with an electronic concentrated engine control system, employing an electronically-controlled fuel-injection system used to switch between a homogeneous combustion mode and a stratified combustion mode, and a variable valve timing and/or lift device used to be changeable a valve overlap during which both exhaust and intake valves are open in the same engine cylinder.

2. Description of the Prior Art

In recent years, there have been proposed and developed various in-cylinder direct-injection spark-ignition engines in which fuel is injected directly into the engine cylinder. Generally, on such direct-injection spark-ignition engines, a combustion mode is switchable between a homogeneous combustion mode and a stratified combustion mode, depending on engine operating conditions, such as engine speed and load. In more detail, the direct-injection spark-ignition engine uses two combustion modes, namely an early injection combustion mode (or a homogeneous combustion mode) where fuel-injection early in the intake stroke produces a homogeneous air-fuel mixture, and a late injection combustion mode (or a stratified combustion mode) where late fuel-injection delays the event until near the end of the compression stroke to produce a stratified air-fuel mixture. One such cylinder direct-injection spark-ignition engine (simply a DI engine) has been disclosed in Japanese Patent Provisional Publication No. 4-183945. The Japanese Patent Provisional Publication No. 4-183945 teaches selecting a stratified combustion mode from at least two combustion modes as previously discussed, during engine operation at partial loads, and also teaches increasing a valve overlap, during which the open periods of the intake and exhaust valves are overlapped, by means of a variable valve timing control device located on at least one of intake and exhaust valves during the stratified combustion mode. The increased valve overlap in the stratified combustion mode results in an increase in a so-called internal exhaust-gas recirculation, thus suppressing a temperature rise in the exhaust temperature (or the combustion temperature). This contributes to reduction in exhaust-emission levels of nitrogen oxides ($NO_x$). In this conventional electronic engine control system of the direct-injection spark-ignition engine disclosed in the Japanese Patent Provisional Publication No. 4-183945, the valve overlap is set at a comparatively large valve overlap during the stratified combustion mode (or during partial loads), whereas the valve overlap is set at a comparatively small valve overlap during the homogeneous combustion mode (or during high loads). The prior art control system suffers from the following drawbacks. There is the response-time delay in increasing the actual valve overlap toward the desired small valve overlap, due to a slight response delay in valve-timing adjustment of the variable valve timing control device, even when the valve overlap is switched to the desired small valve overlap quickly at the time when the combustion mode has been completely switched to the homogeneous combustion mode. In this case, the actual valve overlap remains large for a while, just after the homogeneous combustion mode begins. This deteriorates combustion. To eliminate the response delay of the variable valve timing control device, suppose that the switch timing to the desired valve overlap is advanced evenly irrespective of during two different switch time periods, namely during a first switch time period from stratified to homogeneous combustion, and during a second switch time period from homogeneous to stratified combustion. During the transient switch time period from the homogeneous combustion mode (requiring a small valve overlap) to the stratified combustion mode (requiring a large valve overlap), there is the possibility that the actual valve overlap becomes large before the homogeneous combustion mode terminates. This also deteriorates combustion.

SUMMARY OF THE INVENTION

Accordingly, it is an object of the invention to provide an in-cylinder direct-injection spark-ignition engine with an electronic concentrated engine control system, employing an electronic fuel-injection system used to switch between a homogeneous combustion mode and a stratified combustion mode, which avoids the aforementioned disadvantages of the prior art.

It is another object of the invention to provide an in-cylinder direct-injection spark-ignition engine with an electronic concentrated engine control system, employing an electronic fuel-injection system used to switch between a homogeneous combustion mode and a stratified combustion mode, which is capable of optimizing a switch timing of a valve overlap, being variably adjusted depending on whether the combustion mode is the homogeneous combustion mode or the stratified combustion mode.

It is a further object of the invention to provide an in-cylinder direct-injection spark-ignition engine with an electronic concentrated engine control system, employing an electronic fuel-injection system used to switch between a homogeneous lean combustion mode, a homogeneous stoichiometric combustion mode, and a stratified combustion mode (a lean stratified combustion mode), which is capable of optimizing a switch timing of a valve overlap, being variably adjusted depending on whether the combustion mode is the homogeneous lean combustion mode, the homogeneous stoichiometric combustion mode, or the lean stratified combustion mode.

In order to accomplish the aforementioned and other objects of the present invention, an in-cylinder direct-injection spark-ignition engine using at least a homogeneous combustion mode where early fuel-injection on intake stroke produces a homogeneous air-fuel mixture and a stratified combustion mode where late fuel-injection on compression stroke produces a stratified air-fuel mixture, comprises a variable valve overlap device mounted on at least one of intake and exhaust valves for variably adjusting a valve overlap during which open periods of the intake and exhaust valves are overlapped, and a control unit connected to a fuel injector for switching between the homogeneous combustion mode and the stratified combustion mode, and connected to the variable valve overlap device for switching between a first valve overlap suitable for the homogeneous combustion mode and a second valve overlap suitable for the stratified combustion mode, wherein the control unit comprises an overlap switch timing control section for optimizing a switch timing of the valve overlap, so that a first timing of switching from the first valve overlap to the second valve overlap is different from a second timing of switching from the second valve overlap to the first valve overlap.

DESCRIPTION OF THE PREFERRED EMBODIMENTS

Figure 1:
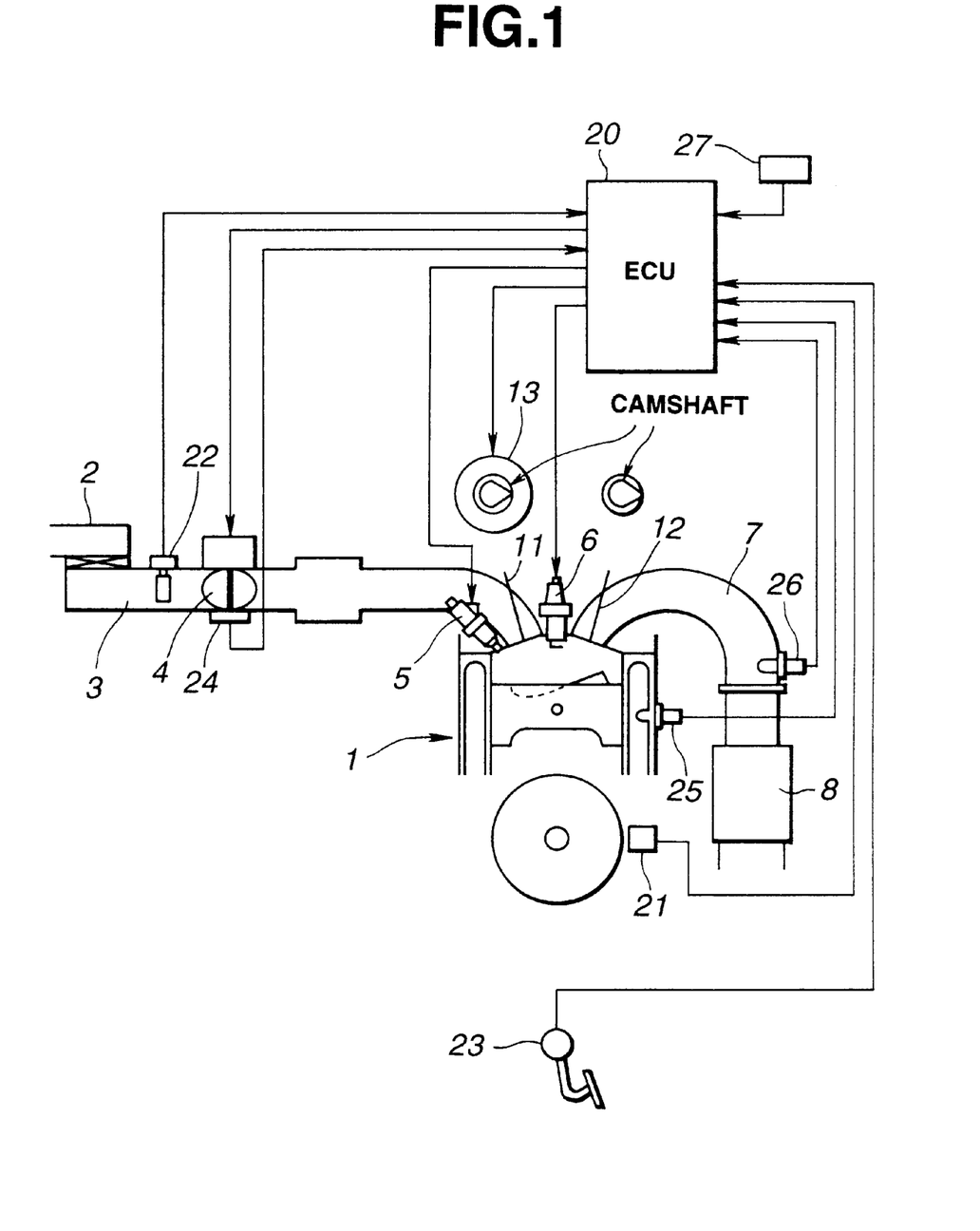
FIG. 1 is a system diagram illustrating an in-cylinder direct-injection spark-ignition engine with an electronic concentrated engine control system of the invention.
Figure 2:
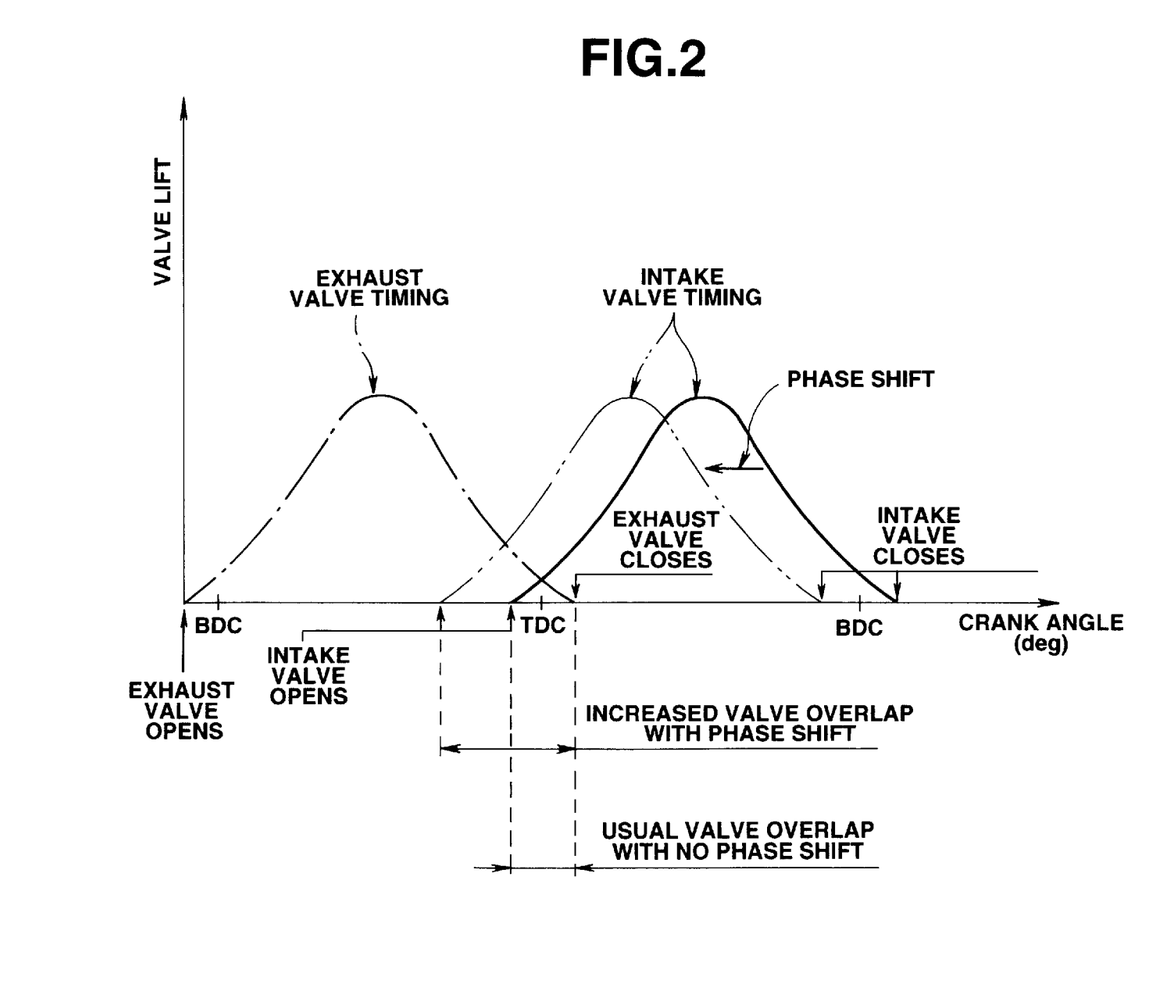
FIG. 2 is a diagram explaining the relationship between a valve overlap with no phase shift and a valve overlap with induction phase advanced.

Referring now to the drawings, particularly to FIG. 1, an electronic concentrated engine control system of the invention is exemplified in an in-cylinder direct-injection spark-ignition DOHC engine equipped with an electronically-controlled variable valve timing device. As seen in FIG. 1, all air, entering the combustion chamber of each engine cylinder of the engine 1, passes first through an air cleaner 2, flows via an intake-air passage 3 toward an electronically-controlled throttle valve 4. The electronically-controlled throttle 4 is disposed in the intake-air passage of the induction system, to electronically control the throttle opening (i.e., the flow rate of intake air entering each intake-valve port), irrespective of depression of the accelerator pedal. The opening and closing of the electronically-controlled throttle 4 is controlled generally by means of a stepper motor (also known as a "stepping motor" or a "step-servo motor"). The stepper motor of the electronically-controlled throttle 4 is connected via a signal line to the output interface (or a drive circuit) of an electronic control unit (ECU) 20, so that the angular steps or essentially uniform angular movements of the stepper motor (not numbered) can be obtained electromagnetically depending on a control signal (or a drive signal) from the output interface of the control unit 20. The electronic fuel-injection system of the direct-injection engine 1 comprises an electromagnetic fuel-injection valve (simply an electromagnetic fuel injector) 5 is provided at each engine cylinder, so that fuel (gasoline) can be injected directly into each combustion chamber. The amount of fuel injected from the electromagnetic fuel injector 5 into the associated engine cylinder is controlled by the pulse-width time (a controlled duty cycle or duty ratio) of a pulsewidth modulated (PWM) voltage signal (simply an injection pulse signal). In more detail, the output interface of the electronic control unit 20 generates the injection pulse signal on the intake stroke and on the compression stroke, in synchronization with revolutions of the engine. The electromagnetic solenoid of the fuel injector 5 is energized and de-energized by the duty cycle pulsewidth modulated (PWM) voltage signal (the injector pulse signal) at a controlled duty cycle. In this manner, the valve opening time of the fuel injector 5 can be controlled by way of the controlled duty cycle and also the fuel, regulated to a desired pressure level, can be injected via the fuel injector and delivered directly into the associated engine cylinder. The direct-injection engine 1 of the embodiment uses at least two combustion modes, one being an early injection combustion mode (or a homogeneous combustion mode) where fuel-injection early in the intake stroke produces a homogeneous air-fuel mixture, and the other being a late injection combustion mode (or a stratified combustion mode) where late fuel-injection delays the event until near the end of the compression stroke to produce a stratified air-fuel mixture. During the homogeneous combustion mode, the early injection in the intake stroke enables the fuel spray to be diffused within the combustion chamber and then to be mixed more uniformly with the air. During the stratified combustion mode, the incoming air mixes with the denser fuel spray due to the late injection in the compression stroke, to create a rich mixture around a spark plug 6 for easy ignition, while the rest of the air-fuel mixture after late injection is very lean at edges of the combustion chamber. The ignition system of the direct-injection engine 1 is responsive to an ignition signal from the ECU 20, for igniting the air-fuel mixture to ensure the homogeneous combustion on the intake stroke and to ensure the stratified combustion on the compression stroke. Roughly speaking, the combustion modes are classified into a homogeneous combustion mode and a stratified combustion mode. If the air/fuel ratio is taken into account, the homogeneous combustion modes are further classified into a homogeneous stoichiometric combustion mode and a homogeneous lean combustion mode. Herein, the air/fuel ratio of the homogeneous stoichiometric combustion mode is 14.6:1 air/fuel ratio (AFR). The air/fuel ratio of the homogeneous lean combustion mode is 20:1 to 30:1 AFR (preferably 15:1 to 22:1 AFR). The air/fuel ratio of the stratified combustion mode (exactly the lean stratified combustion mode or the ultra-lean stratified combustion mode) is 25:1 to 50:1 (preferably 40:1 AFR). The burnt gases is exhausted from the engine cylinder into the exhaust passage 7. As seen in FIG. 1, a catalytic converter 8 is installed in the exhaust passage 7, for converting the pollutants coming from the engine into harmless gases. A variable valve timing control device (VTC) 13 is mounted on at least one of the intake valve 11 and the exhaust valve 12. The variable valve timing control device 13 is provided at the front end of the intake camshaft (the left-hand camshaft in FIG. 1) involved in the intake-valve operating mechanism. In a conventional manner, the variable valve timing control device 13 is operated in response to a control signal (or a command signal) from the ECU 20, for properly advancing or retarding the timing of the intake valve 11. The electronic concentrated engine control system of the shown embodiment uses a conventional variable valve timing control device in which the opening and closing timings can be advanced or retarded by varying the angular phase between the camshaft and the cam sprocket (that is, the angular phase between the camshaft and the crankshaft), while retaining the valve lift unchanged. In such a variable valve timing control device 13 mounted on the front end of the intake camshaft, assuming that the timing of the intake valve 11 is advanced by a desired phase shift, a valve overlap, during which the open periods of the intake (11) and exhaust (12) valves are overlapped, simultaneously varies with phase advance, as seen in FIG. 2. In FIG. 2, the overlapped section between the leftmost characteristic curve (the fixed exhaust-valve timing curve) indicated by the one-dotted line and the intermediate characteristic curve (the intake-valve timing curve with phase advance) indicated by the two-dotted line, corresponds to an increased valve overlap in presence of phase advance. On the other hand, the overlapped section between the rightmost characteristic curve (the intake-valve timing curve without phase shift) indicated by the solid line and the intermediate characteristic curve (the intake-valve timing curve with phase advance), corresponds to a usual valve overlap in absence of phase shift. In this manner, the valve overlap can be adjusted by varying the timing of the intake valve 11 by means of the previously-discussed variable valve timing control device. That is, the variable valve timing control device also serves as a variable valve overlap device. Alternatively, a variable valve lift device or a variable valve timing plus lift device may be used as a variable valve overlap device. Typical details of such a variable valve timing control device, being set forth, for example, in U.S. Pat. No. 5,088,456 issued Feb. 18, 1992 to Seiji Suga, the teaching of which are hereby incorporated by reference.

The electronic control unit 20 comprises a microcomputer, generally constructed by a central processing unit (CPU), a read only memory (ROM), a random access memory (RAM), an analog-to-digital converter, an input/output interface circuitry (or input/output interface unit), and the like. As seen in FIG. 1, the input interface of the control unit 20 receives various signals from engine/vehicle sensors, namely a crank angle sensor 21, an air flow meter 22, an accelerator position sensor (or an accelerator sensor) 23, a throttle sensor 24, a coolant temperature sensor 25, an oxygen sensor ($O_2$ sensor) 26, and a vehicle speed sensor 27. The crank angle sensor 21 is provided for detecting revolutions of the engine crankshaft (or the rotation of the camshaft). Assuming that the number of engine cylinders is "n", the crank angle sensor 21 generates a reference pulse signal REF at a predetermined crank angle for every crank angle 720°/n, and simultaneously generates a unit pulse signal POS (1° signal or 2° signal) for every unit crank angle (1° or 2°). The CPU of the control unit 20 arithmetically calculates an engine speed Ne for example on the basis of the period of the reference pulse signal REF from the crank angle sensor 21. The air flow meter 22 is provided in the intake-air passage 22 upstream of the electronically-controlled throttle 4, to generates an intake-air flow rate signal indicative of an actual intake-air flow rate (or an actual air quantity) Qa. The accelerator position sensor 23 is located near the accelerator pedal to detect an accelerator opening ACC (i.e., a depression amount of the accelerator pedal). The throttle sensor 24 is located near the electronically-controlled throttle 4 to generate a throttle sensor signal indicative of a throttle opening TVO which is generally defined as a ratio of an actual throttle angle to a throttle angle obtained at wide open throttle. The throttle sensor 24 involves an idle switch (not numbered) which is switched ON with the throttle 4 fully closed. The coolant temperature sensor 25 is located on the engine 1 (for example on the engine block) to sense the actual operating temperature (coolant temperature Tw) of the engine 1. The vehicle speed sensor 27 generates a vehicle speed sensor signal indicative of a vehicle speed VSP. The exhaust gas oxygen sensor 26 is located in the exhaust passage 7, to monitor the percentage of oxygen contained within the exhaust gases at all times when the engine 1 is running, and to produce input information representative of how far the actual air-fuel ratio (AFR) deviates from the closed-loop stoichiometric air-fuel ratio (12.6:1). During the closed loop engine operating mode where the exhaust temperature has risen to within a predetermined temperature range, the voltage signal from the $O_2$ sensor 26 is used by the engine control unit (ECU). As is generally known, a voltage level of the voltage signal generated from the $O_2$ sensor 26 is different depending on the oxygen content (high oxygen or low oxygen) in the engine exhaust gases. In case of lean air-fuel mixture (high oxygen concentration), the $O_2$ sensor 26 generates a low voltage signal. On the contrast, in case of rich air-fuel mixture (low oxygen concentration), the $O_2$ sensor 26 generates a high voltage signal. Based on the various vehicle/engine sensor signals REF, POS, Qa, ACC, TVO, Tw, and a voltage signal from the $O_2$ sensor 26, the control unit 20 executes predetermined or preprogrammed arithmetic calculations to achieve various tasks, namely a throttle opening control via the electronically-controlled throttle 4 in the induction system, a fuel-injection amount control and an injection timing control via the electromagnetic solenoid of the fuel injector 5 in the electronic fuel-injection system, an ignition timing control via the spark plug 6 in the ignition system, and a valve overlap control via the variable valve timing control device 13. The electronic concentrated engine control system of the in-cylinder direct-injection spark-ignition engine of the embodiment performs the arithmetic calculations or data processing as shown in the system block diagram of FIG. 3.

Figure 3:
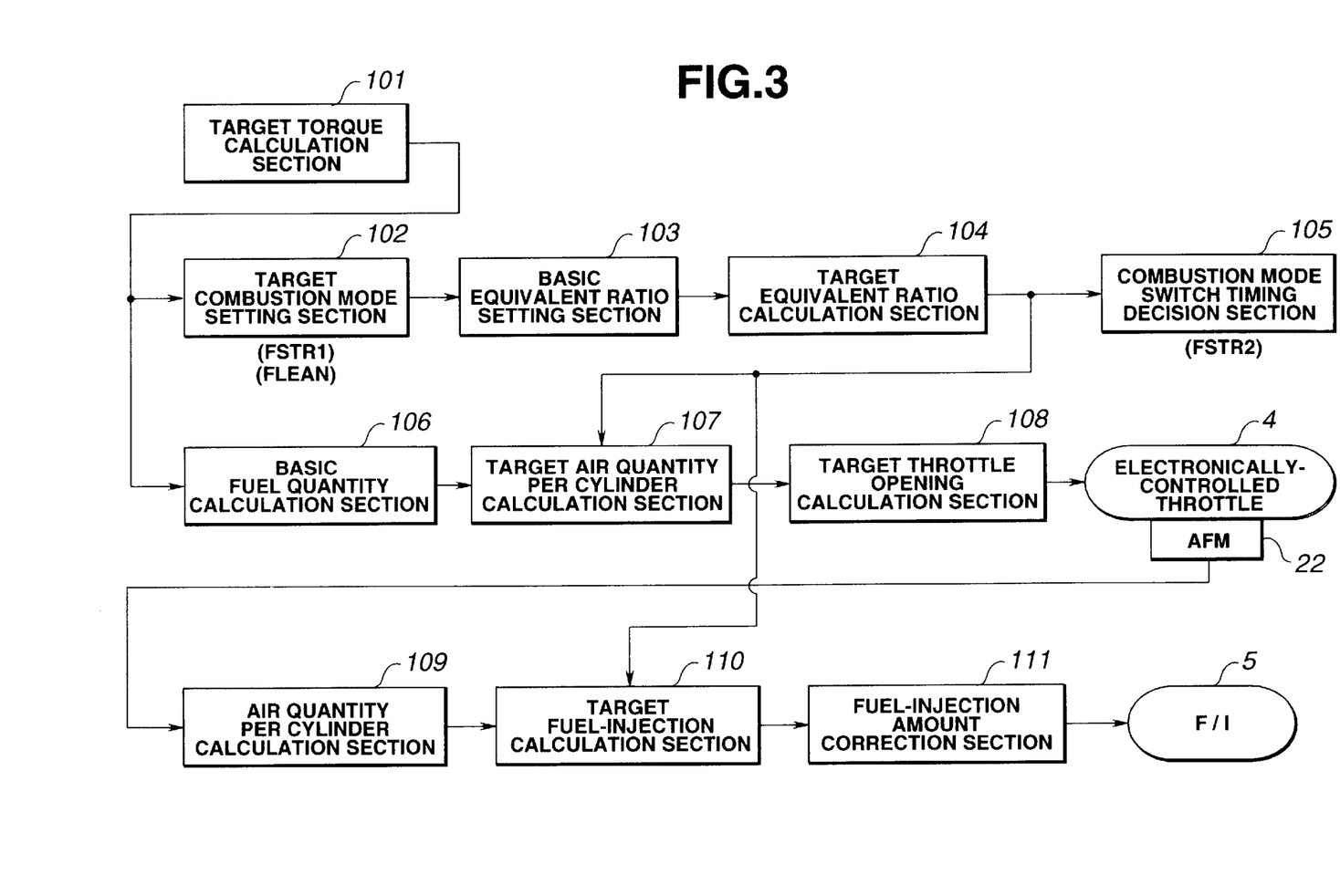
FIG. 3 is a system block diagram illustrating a combustion mode control system being applicable to the direct-injection engine shown in FIG. 1.

Referring now to FIG. 3, a target torque calculation section 101 retrieves a driver-required torque (a torque component based on the driver's wishes) on the basis of both the accelerator opening ACC and the engine speed Ne, from a predetermined or preprogrammed characteristic map representative of the relationship among the accelerator opening ACC, the engine speed Ne, and the driver-required torque. The target torque calculation section 101 further calculates a target torque (or a desired engine-power output) tTe by adding an engine-required torque to the driver-required torque. A target combustion mode setting section 102 selects a desired combustion mode from a homogeneous stoichiometric combustion mode, a homogeneous lean combustion mode, and a lean stratified combustion mode (a ultra-lean stratified combustion mode) by reference to a predetermined or preprogrammed combustion mode map representative of the relationship among the engine speed Ne, the target torque tTe, and the desired combustion mode. A plurality of combustion mode maps are preprogrammed for each coolant temperatures Tw and for each elapsed time from engine starting, and stored in the predetermined memory addresses. Therefore, either one of the preprogrammed combustion mode maps is selected depending on the additional parameters, such as the coolant temperature Tw, and the elapsed time from engine starting. Also, the target combustion mode setting section 102 resets or sets both a target combustion mode switch flag FSTR1 and a lean combustion flag FLEAN in the following manner, depending on the desired combustion mode retrieved from the selected combustion mode map. When the desired combustion mode, based on the previously-noted various parameters, is the homogeneous combustion mode (either the homogeneous stoichiometric combustion mode or the homogeneous lean combustion mode), the target combustion mode switch flag FSTR1 is reset at "0". Conversely, when the desired combustion mode is the stratified combustion mode (that is, the lean stratified combustion mode), the target combustion mode switch flag FSTR1 is set at "1". On the other hand, the lean combustion flag FLEAN is used to distinguish the homogeneous stoichiometric combustion mode from the homogeneous lean combustion mode. When the actual combustion mode is the homogeneous stoichiometric combustion mode, the lean combustion flag FLEAN is reset at "0". On the contrary, when the actual combustion mode is the homogeneous lean combustion mode, the lean combustion flag FLEAN is set at "1". A basic equivalent ratio setting section 103 sets or arithmetically calculates a basic equivalent ratio TFBYA0 based on both the engine speed Ne and the target torque tTe, by reference to the selected one of predetermined characteristic maps, each of which is representative of the relationship among the engine speed Ne, the target torque tTe, and the basic equivalent ratio TFBYA0. The above-mentioned engine operating condition (Ne, tTe) versus basic equivalent ratio (TFBYA0) characteristic map is preprogrammed for each of the three combustion modes, namely the homogeneous stratified combustion mode, the homogeneous lean combustion mode, and the lean stratified combustion mode. The engine operating condition (Ne, tTe) versus basic equivalent ratio (TFBYA0) characteristics are different depending on the three different combustion modes, and thus the basic equivalent ratio TFBYA0 is based on the target combustion mode selected. In the embodiment, the stoichiometric air/fuel ratio (often called a "Lambda point") is 14.6:1. Actually, the basic equivalent ratio setting section 103 arithmetically calculates the basic equivalent ratio TFBYA0 by way of an equation of Equivalent ratio=Stoichiometric air/fuel ratio (14.6:1)/ Actual air-fuel ratio. Taking account of dynamic characteristics of the induction system (that is, a phase lag of the intake-air flow rate), a target equivalent ratio calculation section 104 derives or calculates a target equivalent ratio TFBYA on the basis of the basic equivalent ratio TFBYA0 calculated, from the following expression.

$$TFBYA = M \times TFBYA0 + (1-M) \times TFBYA$$

where M denotes a weighting factor of weighted mean, TFBYA indicated in the left-hand side of the expression corresponds to the latest up-to-date target equivalent ratio derived at the current cycle of arithmetic processing, and TFBYA indicated in the right-hand side of the expression corresponds to the previous target equivalent ratio derived one cycle before. As discussed above, a predetermined phase-lag processing (a weighted-mean processing) is made to the basic equivalent ratio TFBYA0 to compensate for a first-order lag of the intake-air flow rate, and to ensure the phase matching between the target equivalent ratio TFBYA and the intake-air flow rate.

A combustion mode switch timing decision section 105 comprises a comparator for comparing the target equivalent ratio TFBYA to a predetermined threshold value. The predetermined threshold value is different depending on whether the desired combustion mode is the homogeneous stoichiometric combustion mode, the homogeneous lean combustion mode, or the lean stratified combustion mode. Switching between the combustion modes occurs actually, when the target equivalent ratio TFBYA goes across the predetermined threshold value. For example, when the combustion mode is actually switched from the stratified combustion mode (the lean stratified combustion mode) to the homogeneous combustion mode (either the homogeneous stratified combustion mode or the homogeneous lean combustion mode), an actual combustion mode switch flag FSTR2 is reset at "0", and at the same time the fuel injection timing is set at the intake stroke. Conversely, when the combustion mode is actually switched from the homogeneous combustion mode to the stratified combustion mode (the lean stratified combustion mode), the actual combustion mode switch flag FSTR2 is set at "1", and simultaneously the fuel injection timing is set at the compression stroke. In other words, an actual combustion mode is estimated depending on the sign of the flag FSTR2. A basic fuel quantity calculation section 106 temporarily retrieves an instantaneous basic fuel quantity on the basis of both the target torque tTe and the engine speed Ne, from a predetermined engine operating condition (Ne, tTe) versus instantaneous basic fuel quantity characteristic map. Additionally, the basic fuel quantity calculation section 106 compensates for the instantaneous basic fuel quantity depending on the air/fuel ratio (AFR), since the air/fuel ratio remarkably varies depending on whether the combustion mode is the homogeneous combustion mode or the stratified combustion mode. The compensated basic fuel quantity is set at a basic fuel quantity tQf. A target air quantity per cylinder calculation section 107 arithmetically calculates a target quantity of air to be supplied into an engine cylinder on the basis of both the basic fuel quantity tQf and the target equivalent ratio TFBYA, from the following expression.

$$tQcy1 = tQf \times (14.6/TFBYA)$$

A target throttle opening calculation section 108 retrieves a target throttle opening tTVO on the basis of both the target air quantity per cylinder tQcy1 and the engine speed Ne, from a predetermined or preprogrammed characteristic map representative of the relationship among the target air quantity per cylinder tQcy1, the engine speed Ne, and the target throttle opening tTVO. The target throttle opening calculation section 108 sends out a command signal based on the calculated target throttle opening (tTVO) to the stepper motor of the electronically-controlled throttle 4 to adjust the throttle opening of the throttle 4 toward the calculated target throttle opening tTVO by virtue of the angular movement of the stepper motor. On the other hand, the actual intake-air flow rate Qa is detected or measured by the air flow meter 22. An air quantity per cylinder calculation section 109 divides the actual intake-air quantity Qa by the engine speed Ne, and then makes a smoothing and phase-lag processing with respect to the divided value (Qa/Ne) to calculate a quantity-of-air Qcy1 supplied into an engine cylinder. A target fuel-injection amount calculation section 110 arithmetically calculates an instantaneous target fuel-injection amount tQfi based on both the air quantity per cylinder Qcy1 and the target equivalent ratio TFBYA, from the following expression.

$$tQfi = K \times Qcy1 \times TFBYA$$

where K is a predetermined constant, and K×Qcy1 corresponds to a target fuel-injection amount with a stoichiometric air/fuel ratio.

A fuel-injection amount correction section 111 makes predetermined corrections with respect to the instantaneous target fuel-injection amount tQfi by using various correction factors, for example an air/fuel ratio correction factor, a water-temperature increment correction factor, an engine startup period increment correction factor, a deceleration period decrement correction factor, and the like. The corrected fuel-injection amount is finally set as a target fuel-injection amount tQfi. During the fuel-injection period of time, an injection pulse signal (an enrichment command signal or a lean command signal) of a controlled duty cycle (a pulse-width time based on the target fuel-injection amount tQfi) is sent out to the fuel injector 5 of the electronic fuel injection system, so that the fuel injector 5 is driven to supply the target fuel-injection amount tQfi into the cylinder. In controlling the ignition timing of the spark plug 6, the ignition timing ADV is determined or retrieved depending on the engine operating condition such as the engine speed Ne and load, from the selected one of predetermined characteristic maps, each of which is representative of the relationship among the engine speed Ne, the engine load, and the ignition timing ADV. The engine load is generally estimated by an accelerator opening ACC. The engine operating condition versus ignition timing (ADV) characteristic map is preprogrammed for each of the previously-described three combustion modes. The spark plug 6 of each engine cylinder is fired depending on the ignition timing ADV determined.

Figure 4:
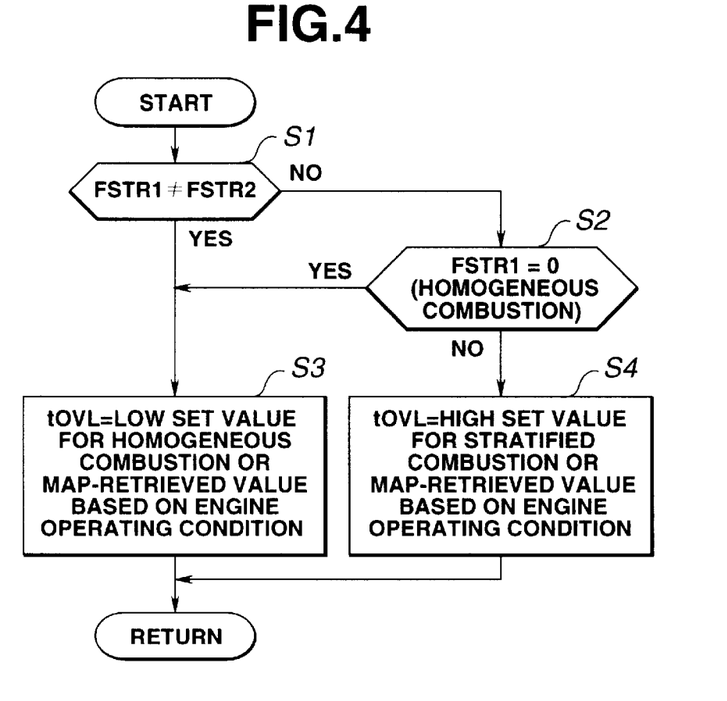
FIG. 4 is a flow chart illustrating a first valve overlap control routine.
Figure 5:
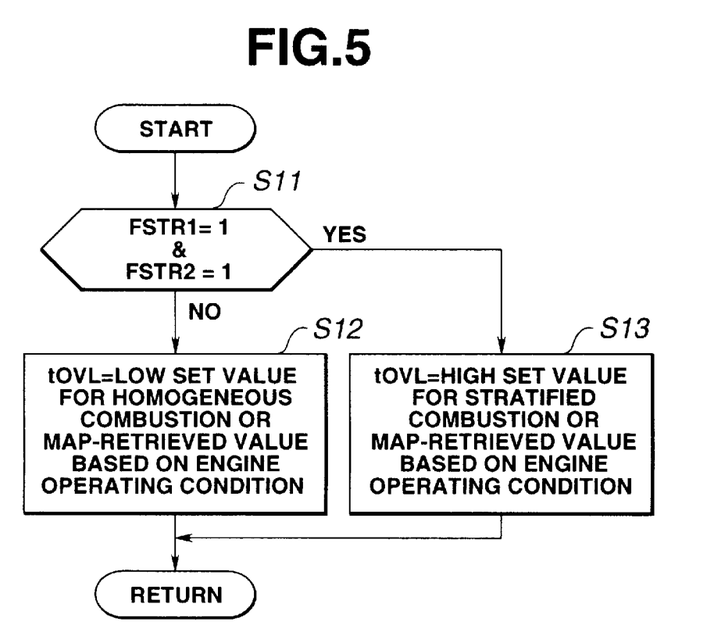
FIG. 5 is a flow chart illustrating a second valve overlap control routine.
Figure 6:
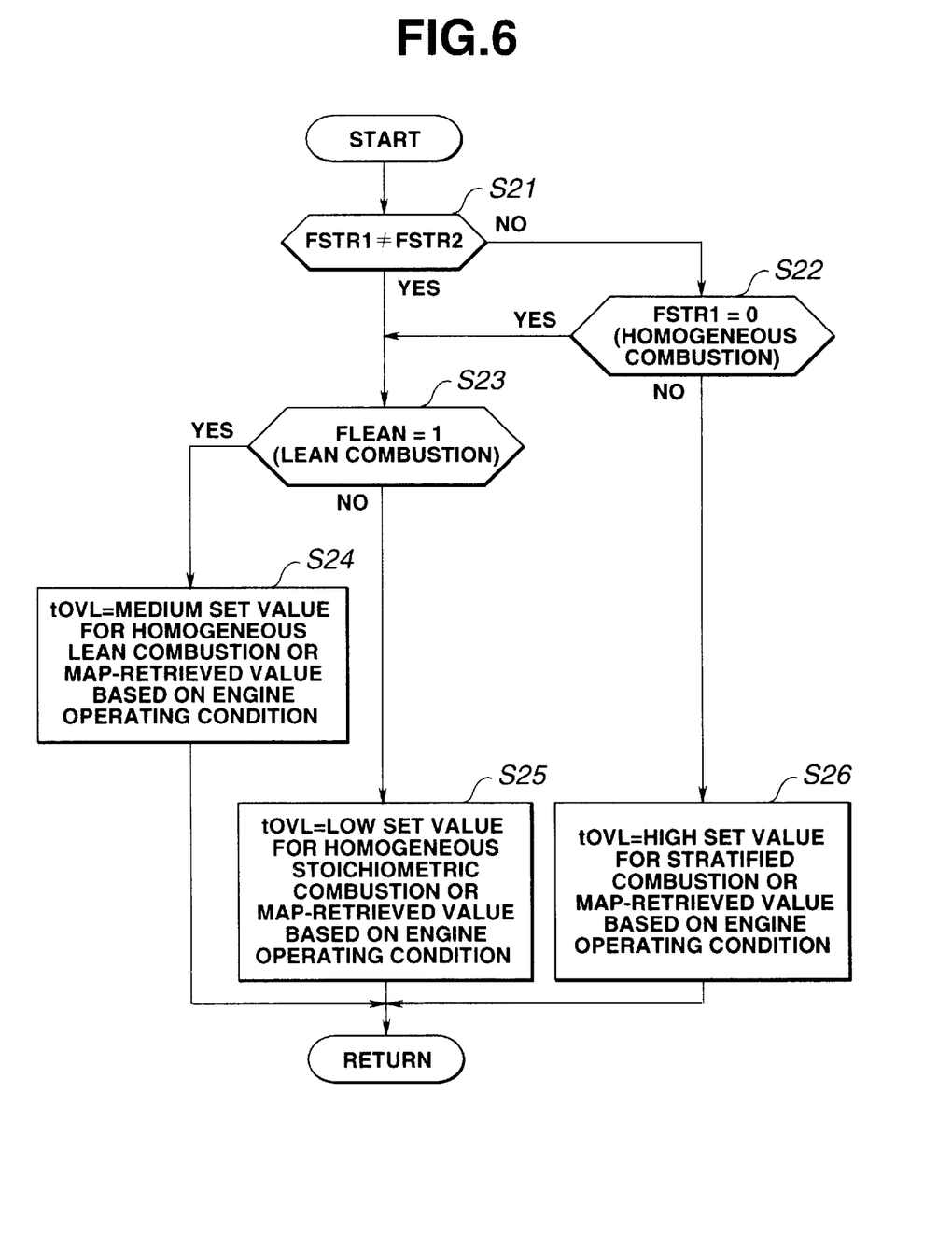
FIG. 6 is a flow chart illustrating a third valve overlap control routine.
Figure 7A:
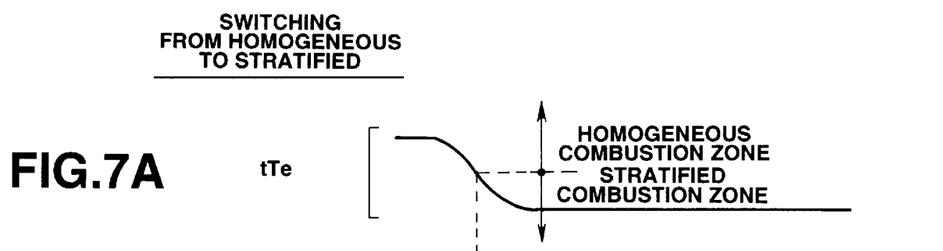
FIGS. 7A–7E are timing charts illustrating the relationship among a target torque (tTe), a target combustion mode switch flag (FSTR1), an actual combustion mode switch flag (FSTR2), a target valve overlap (tOVL), and an actual valve overlap (rOVL), during the switch time period from homogeneous to stratified combustion, in the first and second valve overlap control routines shown in FIGS. 4 and 5.
Figure 7B:
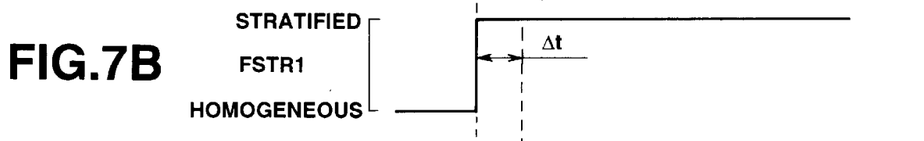
Figure 7C:
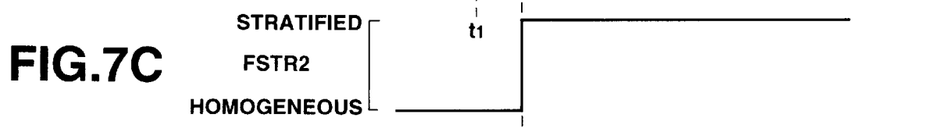
Figure 7D:
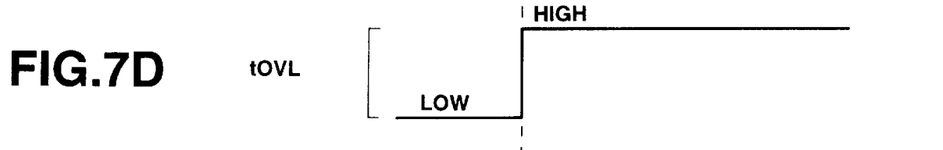
Figure 7E:
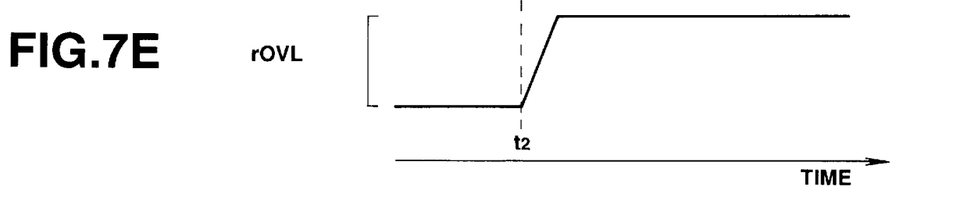
Figure 8A:
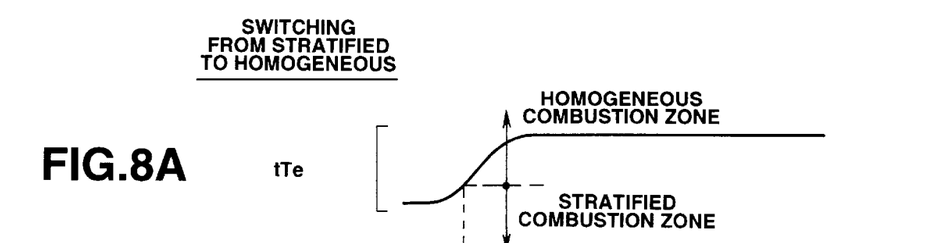
FIGS. 8A–8E are timing charts illustrating the relationship among the previously-noted five factors (tTe, FSTR1, FSTR2, tOVL, and rOVL), during the switch time period from stratified to homogeneous combustion, in the first and second valve overlap control routines shown in FIGS. 4 and 5.
Figure 8B:
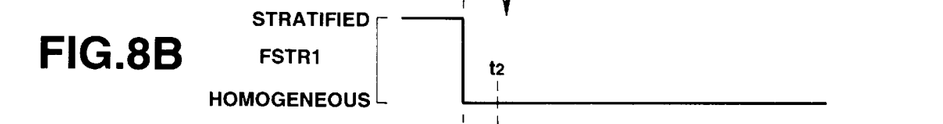
Figure 8C:
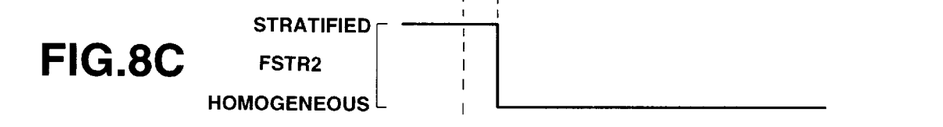
Figure 8D:
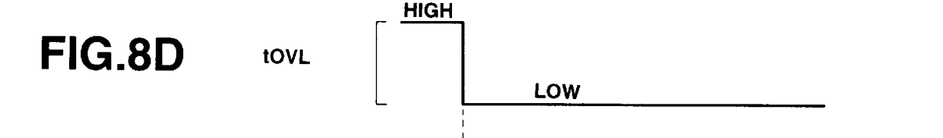
Figure 8E:
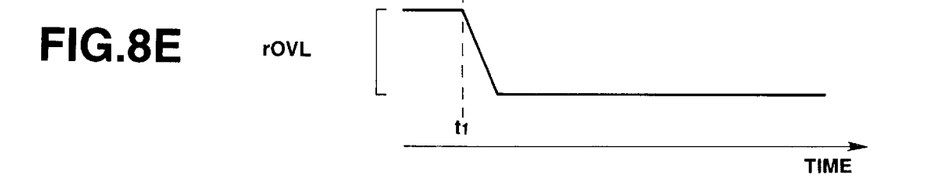
Figure 9A:
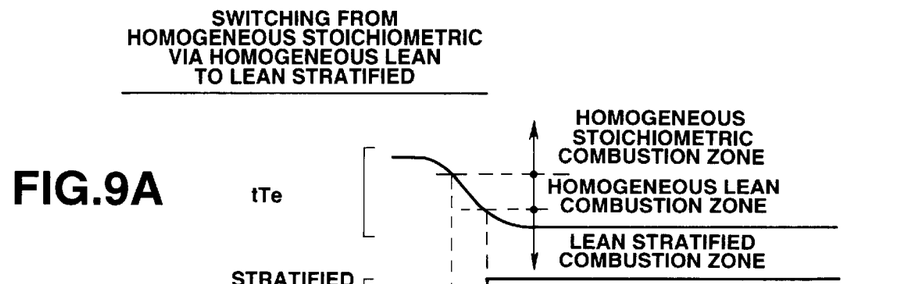
FIGS. 9A–9G are timing charts illustrating the relationship among a target torque (tTe), a target combustion mode switch flag (FSTR1), a homogeneous lean combustion flag (FLEAN), an actual combustion mode switch flag (FSTR2), a target valve overlap (tOVL), an actual valve overlap (rOVL), and a target equivalent ratio (TFBYA), during the switch time period from homogeneous to stratified combustion, in the third valve overlap control routine shown in FIG. 6.
Figure 9B:
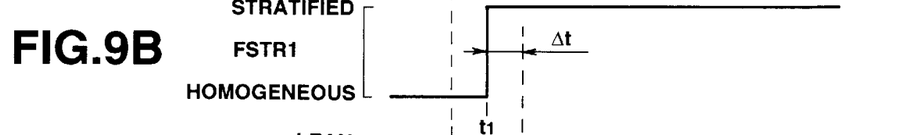
Figure 9C:
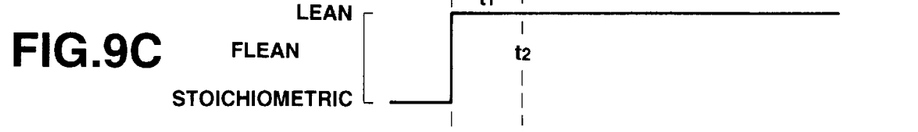
Figure 9D:
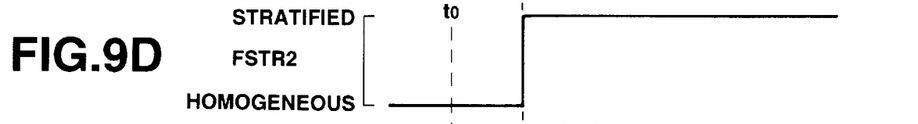
Figure 9E:
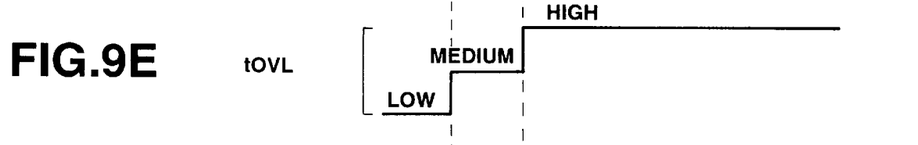
Figure 9F:
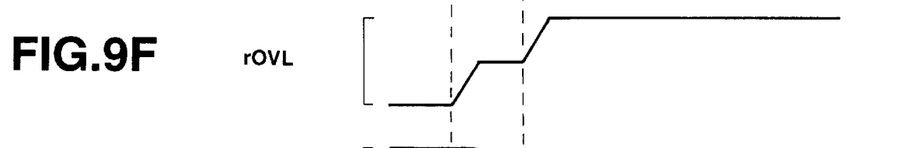
Figure 9G:
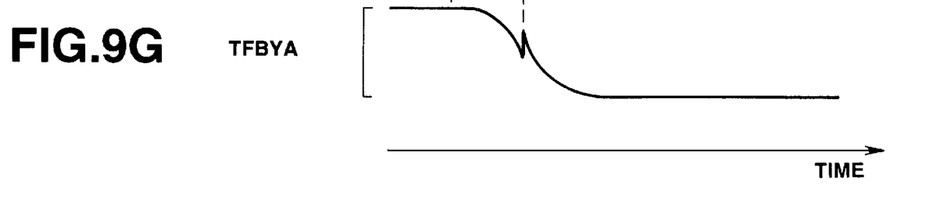
Figure 10A:
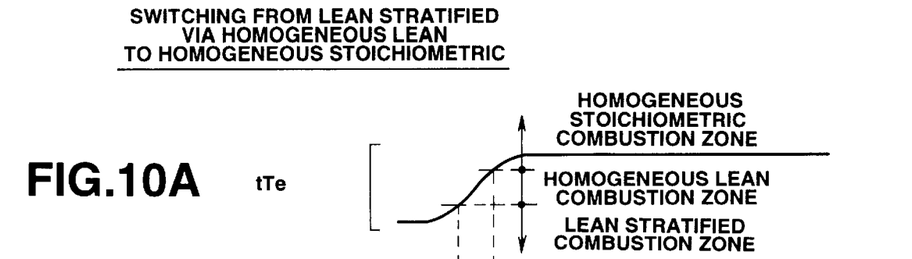
FIGS. 10A–10G are timing charts illustrating the relationship among the previously-noted five factors (tTe, FSTR1, FLEAN, FSTR2, tOVL, rOVL, TFBYA), during the switch time period from stratified to homogeneous combustion, in the third valve overlap control routine shown in FIG. 6.
Figure 10B:
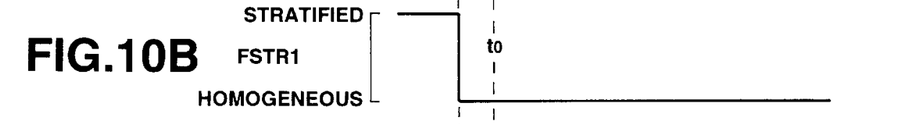
Figure 10C:
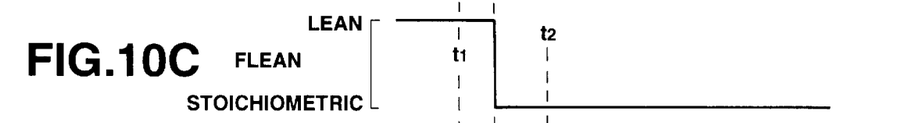
Figure 10D:
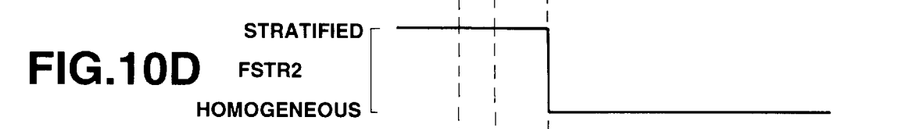
Figure 10E:
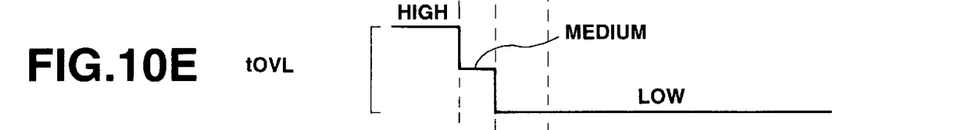
Figure 10F:
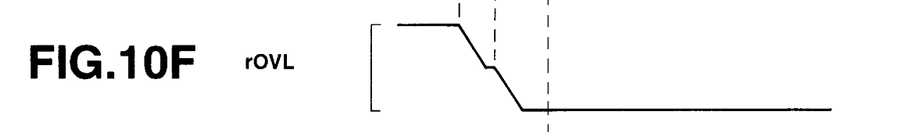
Figure 10G:
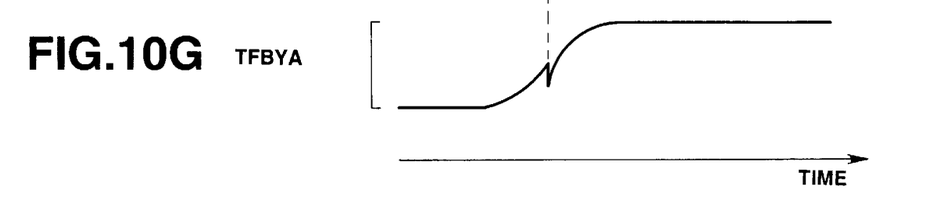

Details of the variable valve overlap control, attained by virtue of the variable valve timing control device 13, are described hereunder in accordance with each of the flow charts shown in FIGS. 4, 5 and 6.

Referring now to FIG. 4, there is shown a first valve overlap control routine which is used for switching the valve overlap and for controlling the timing of switching between the combustion modes.

In step S1, a test is made to determine whether the target combustion mode switch flag FSTR1 is not equal to the actual combustion mode switch flag FSTR2. That is, the electronic control unit (ECU) 20 determines the presence or absence of switching requirement between the combustion modes, depending on a condition of FSTR1=FSTR2, and a condition of FSTR1≠FSTR2. When the answer to step S1 is in the negative (NO), that is, in case of FSTR1=FSTR2, the ECU 20 determines that the switching requirement between the combustion modes does not occur. Then, step S2 occurs. In step S2, a test is made to determine whether the target combustion switch flag FSTR1 is "0". Step S2 is used to determine whether the target combustion mode switch flag FSTR1 (equal to FSTR2 in case of the flow from step S1 to step S2) is "0". In other words, in step S2, a check is made to determine whether the actual combustion mode is the homogeneous combustion mode, because the condition of FSTR1="0" means the homogeneous combustion mode (either the homogeneous stoichiometric combustion mode or the homogeneous lean combustion mode). On the contrary, when the answer to step S1 is in the affirmative (YES), that is, in case of FSTR1≠FSTR2, the ECU 20 determines that the switching requirement between the combustion modes occurs. Thereafter, step S3 occurs. When the answer to step S2 is in the affirmative (YES), that is, in case of FSTR1=FSTR2=0 (during the homogeneous combustion mode), the routine also flows to step S3. In step S3, the target valve overlap tOVL is set at a comparatively low set value suitable for the homogeneous combustion mode (FSTR1=0). Alternatively, in step S3, the target valve overlap tOVL may be set or retrieved on the basis of the engine operating condition, such as the engine speed Ne and the engine load, from a predetermined target valve overlap versus engine operating condition characteristic map for use in the homogeneous combustion mode. To variably control or regulate the valve overlap more accurately, the use of the map-retrieved value, defined as a variable based on the engine operating condition (engine speed and load), is superior to the use of the predetermined low set value being a fixed value irrespective of engine speed and load. When the answer to step S2 is in the negative (NO), that is, in case of FSTR1=FSTR2=1 (during the stratified combustion mode), the routine flows to step S4. In step S4, the target valve overlap tOVL is set at a comparatively high set value suitable for the stratified combustion mode (FSTR1=1). Alternatively, in step S4, the target valve overlap tOVL may be set or retrieved on the basis of the engine operating condition, such as the engine speed Ne and the engine load, from a predetermined target valve overlap versus engine operating condition characteristic map for use in the stratified combustion mode. The switch timing of the target valve overlap tOVL and the actual valve overlap rOVL in the switching mode from homogeneous to stratified combustion mode, obtained by the first overlap control routine shown in FIG. 4, is hereinbelow explained by reference to the timing charts shown in FIGS. 7A to 7E.

As seen in FIGS. 7A–7E, during the transient switching period of time from the homogeneous combustion mode to the stratified combustion mode, the target valve overlap tOVL is maintained at a low level (a predetermined low valve overlap suitable for homogeneous combustion) for a brief time duration from a target combustion mode switch timing $t_1$ to an actual combustion mode switch timing $t_2$. In other words, during the transient switching period of time from the homogeneous combustion mode to the stratified combustion mode, the target valve overlap tOVL remains low, until the flag FSTR1 indicative of the target combustion mode becomes identical to the flag FSTR2 indicative of the actual combustion mode (that is, until the condition of FSTR1=FSTR2=1 is satisfied from the time when the condition of FSTR1≠FSTR2 has been satisfied). At the time ($t_2$) when the condition of FSTR1=FSTR2=1 has been satisfied after occurrence ($t_1$) of the homogeneous-to-stratified combustion mode switching requirement, the target valve overlap tOVL is instantaneously shifted from low (a predetermined low valve overlap suitable for homogeneous combustion) to high (a predetermined high valve overlap suitable for stratified combustion). Note that there is a time delay ($\Delta t = t_2 - t_1$), until the actual combustion mode is completely shifted to the stratified combustion mode from the time $t_1$ of the homogeneous-to-stratified combustion mode switching requirement. Therefore, during the ending period of the homogeneous combustion mode, due to the time delay $\Delta t$ there is no possibility that the actual valve overlap rOVL shifts from low to high. During the homogeneous combustion mode just before switching from homogeneous to stratified combustion mode, the first overlap control routine effectively prevents the actual overlap rOVL from being shifted from low to high. This prevents deterioration in combustion.

The switch timing of the target valve overlap tOVL (or the actual valve overlap rOVL) in the switching mode from stratified-to-homogeneous combustion mode, is explained by reference to the timing charts shown in FIGS. 8A to 8E. As seen in FIGS. 8A–8E, during the transient switching period of time from the stratified combustion mode to the homogeneous combustion mode, the target valve overlap tOVL is quickly instantaneously shifted from high to low at the target combustion mode switch timing $t_1$ (FSTR1 1→0) earlier than the actual combustion mode switch timing $t_2$ (FSTR2 1→0). In other words, during the transient switching period of time from the stratified combustion mode to the homogeneous combustion mode, the target valve overlap tOVL shifts from high to low (see the flow from step S1 to step S3) instantaneously at the time (the switch point $t_1$) when the condition of FSTR1≠FSTR2 has been satisfied. On the other hand, the actual valve overlap rOVL tends to shift from high to low with a slight time lag, resulting from the response delay in valve-timing adjustment of the variable valve timing control device 13. Owing to the earlier switch timing ($t_1$), the actual valve overlap rOVL never remains high during early stages (the starting period) of homogeneous combustion mode, irrespective of the response delay in valve-timing adjustment (i.e., the response delay in valve-overlap adjustment). As can be appreciated from the timing charts shown in FIGS. 8C and 8E, the actual valve overlap rOVL is rapidly reduced to low substantially at the actual combustion mode switch timing $t_2$, owing to the earlier switch timing ($t_1$). This prevents deterioration in combustion.

Referring now to FIG. 5, there is shown a second valve overlap control routine.

In step S11, a test is made to determine whether the target combustion mode switch flag FSTR1 is set at "1" (stratified combustion mode), and additionally the actual combustion mode switch flag FSTR2 is set at "1" (stratified combustion mode). When the answer to step S11 is negative (NO), that is, in case of FSTR1=FSTR2=0, FSTR1=1 & FSTR2=0, or FSTR1=0 & FSTR2=1, step S12 occurs. In step S12, the target valve overlap tOVL is set at a comparatively low set value suitable for the homogeneous combustion mode. Alternatively, in step S12, the target valve overlap tOVL may be set or retrieved on the basis of the engine operating condition, such as the engine speed Ne and the engine load, from a predetermined target valve overlap versus engine operating condition characteristic map for use in the homogeneous combustion mode. When the answer to step S11 is affirmative (YES), that is, in case of FSTR1=FSTR2=1, step S13 occurs. In step S13, the target valve overlap tOVL is set at a comparatively high set value suitable for the stratified combustion mode. Alternatively, in step S13, the target valve overlap tOVL may be set or retrieved on the basis of the engine operating condition, such as the engine speed Ne and the engine load, from a predetermined target valve overlap versus engine operating condition characteristic map for use in the stratified combustion mode. As discussed above, according to the second valve overlap control routine, the valve overlap can be set at a predetermined high valve overlap suitable for stratified combustion, only when the target combustion mode is the stratified combustion mode and additionally the actual combustion mode is the stratified combustion mode (i.e., FSTR1=1 & FSTR2=1). Conversely, when the condition of FSTR1=FSTR2=1 is unsatisfied, the actual valve overlap can be set at a predetermined low valve overlap suitable for homogeneous combustion. In this manner, although the second valve overlap control routine of FIG. 5 is simplified as compared to the first valve overlap control routine of FIG. 4, the second routine of FIG. 5 produces the same effect as the first routine of FIG. 4. That is, the second routine can perform the valve overlap control indicated by the timing charts shown in FIGS. 7A–7E in case of occurrence of homogeneous-to-stratified combustion mode switching requirement, and perform the valve overlap control indicated by the timing charts shown in FIG. 8A–8E in case of occurrence of stratified-to-homogeneous combustion mode switching requirement.

As may be appreciated from FIGS. 4, 5, 7A–7E, and 8A–8E, according to the first and second valve overlap control routines, the switch timing from high to low valve overlap is identical to a first switch timing (a first switch point) $t_1$ of occurrence of switching requirement between the combustion modes, whereas the overlap switching action from low to high begins at the actual combustion mode switch timing $t_2$, retarded by a time delay $\Delta t$ ($=t_2-t_1$) from the first switch point $t_1$. Thus, during the transient switching period of time from homogeneous to stratified combustion mode, the actual overlap rOVL can be switched to high at the later valve overlap switch timing $t_2$ in comparison with the first switch point $t_1$. Conversely, during the transient switching period of time from stratified to homogeneous combustion mode, the actual overlap rOVL can be switched quickly to low at the earlier valve overlap switch timing $t_1$.

Referring now to FIG. 6, there is shown a third valve overlap control routine. The third valve overlap control routine is different from the first and second valve overlap control routines, in that the homogeneous combustion mode is further divided into the homogeneous stoichiometric combustion mode and the homogeneous lean combustion mode, and the homogeneous lean combustion flag FLEN is introduced in addition to the two flags FSTR1 and FSTR2. That is to say, in the third valve overlap control routine shown in FIG. 6, owing to the three different flags FSTR1, FSTR2, and FLEAN, there are two switch points, namely a first switch point between the lean stratified combustion mode and the homogeneous lean combustion mode, and a second switch point between the homogeneous lean combustion mode and the homogeneous stoichiometric combustion mode. As can be appreciated from comparison between the flow charts shown in FIG. 4 and 6, steps S1, S2, and S4 of FIG. 4 respectively correspond to steps S21, S22, and S26 of FIG. 6. In the third routine shown in FIG. 6, steps S23, S24, and S25 are used in place of step S3 shown in FIG. 4. The third routine of FIG. 6 is described in detail hereunder.

In step S21, a test is made to determine whether the target combustion mode switch flag FSTR1 is unequal to the actual combustion mode switch flag FSTR2, that is, the condition of FSTR1≠FSTR2 is satisfied. That is, step S21 determines whether the combustion mode switching requirement occurs. When the answer to step S21 is negative (FSTR1=FSTR2) and thus there is no switching requirement between the combustion modes, step S22 occurs. In step S22, a check is made to determine whether the target combustion mode switch flag FSTR1 is "0" (homogeneous combustion). Conversely, when the answer to step S21 is affirmative (FSTR1≠FSTR2) and thus the combustion mode switching requirement occurs, step S23 occurs. Also, when the answer to step S22 is affirmative (FSTR1=0) just after the answer to step S21 is negative (FSTR1=FSTR2), that is, when the condition FSTR1=FSTR2=0 is satisfied, the procedure also flows to step S23. In step S23, a test is made to determine whether the homogeneous lean combustion flag FLEAN is set at "1". In other words, in step S23, a check is made to determine whether the actual combustion mode is the homogeneous lean combustion mode. When the answer to step S23 is affirmative (FLEAN=1), step S24 occurs. In step S24, the target valve overlap tOVL is set at a medium set value suitable for the homogeneous lean combustion-mode (FLEAN=1). Alternatively, in step S24, the target valve overlap tOVL may be set or retrieved on the basis of the engine operating condition, such as the engine speed Ne and the engine load, from a predetermined target valve overlap versus engine operating condition characteristic map for use in the homogeneous lean combustion mode. When the answer to step S23 is negative (FLEAN=0) and therefore the actual combustion mode is the homogeneous stoichiometric combustion mode, step S25 occurs. In step S25, the target valve overlap tOVL is set at a low set value suitable for the homogeneous stoichiometric combustion mode (FLEAN= 0). Alternatively, in step S25, the target valve overlap tOVL may be set or retrieved on the basis of the engine operating condition, such as the engine speed Ne and the engine load, from a predetermined target valve overlap versus engine operating condition characteristic map for use in the homogeneous stoichiometric combustion mode. On the contrary, when the answer to step S22 is negative (FSTR1=1) just after the answer to step S21 is negative (FSTR1=FSTR2), that is, when the condition of FSTR1=FSTR2=1 is satisfied and thus the actual combustion mode is the stratified combustion mode (the lean stratified combustion mode) without any combustion mode switching requirement, the procedure flows from step S22 to step S26. In step S26, the target valve overlap tOVL is set at a high set value suitable for the stratified combustion mode (FSTR1=1). Alternatively, in step S26, the target valve overlap tOVL may be set or retrieved on the basis of the engine operating condition, such as the engine speed Ne and the engine load, from a predetermined target valve overlap versus engine operating condition characteristic map for use in the stratified combustion mode. The previously-noted three characteristic maps are different from each other. The switch timing of the valve overlap in the switching mode from homogeneous-stoichiometric via homogeneous-lean to ultra-lean-stratified combustion mode, obtained by the third overlap control routine shown in FIG. 6, is hereinbelow explained by reference to the timing charts shown in FIGS. 9A to 9G.

As seen in FIGS. 9A–9G, during the transient switching period of time from the homogeneous-stoichiometric combustion mode via the homogeneous-lean combustion mode to the ultra-lean-stratified combustion mode, the target overlap tOVL is, first of all, switched from a low level (a predetermined low valve overlap suitable for homogeneous stoichiometric combustion) to a medium level (a predetermined medium valve overlap suitable for homogeneous lean combustion), at the time to when the homogeneous lean combustion flag FLEAN is switched from "0" to "1". The time $t_0$ will be herebelow referred to as a "second switch point or second switch timing", whereas the time $t_1$ will be hereinafter referred to as a "first switch point or first switch timing". Then, the target overlap tOVL is switched from the medium level (the predetermined medium valve overlap suitable for homogeneous lean combustion) to a high level (a predetermined high valve overlap suitable for ultralean stratified combustion) at the time $t_2$, when the actual combustion mode switch flag FSTR2 becomes set, with a time delay $\Delta t$ ($=t_2-t_1$) from the time $t_1$ of the homogeneous-lean to ultra-lean-stratified combustion mode switching requirement. During the homogeneous lean combustion mode just before switching from homogeneous-lean to ultra-lean-stratified combustion mode, the third overlap control routine effectively prevents the actual overlap rOVL from being shifted from medium to high. This prevents deterioration in combustion.

The switch timing of the valve overlap in the switching mode from ultra-lean-stratified via homogeneous-lean to homogeneous-stoichiometric combustion mode, obtained by the third overlap control routine shown in FIG. 6, is hereinbelow explained by reference to the timing charts shown in FIGS. 10A to 10G.

As seen in FIGS. 10A–10G, during the transient switching period of time from the ultra-lean-stratified combustion mode via the homogeneous-lean combustion mode to the homogeneous-stoichiometric combustion mode, first of all, the target overlap tOVL is quickly instantaneously switched from high to medium at the time $t_1$ (FSTR1 1→0) of ultra-lean-stratified to homogeneous-lean combustion mode switching requirement earlier than the time $t_0$ (FLEAN 1→0) of homogeneous-lean to homogeneous-stoichiometric combustion mode switching requirement. In other words, during the transient switching period of time from the ultra-lean stratified combustion mode to the homogeneous-lean combustion mode, the target valve overlap tOVL shifts from high to medium (see the flow from step S21 via step S23 to step S24) instantaneously at the time (the first switch point $t_1$) when the two necessary conditions of FSTR1≠FSTR2 and FLEAN=1 have been satisfied. On the other hand, the actual valve overlap rOVL tends to shift from high to medium with a slight time lag, resulting from the response delay in valve-timing adjustment of the variable valve timing control device 13. Owing to the earlier switch timing ($t_1$), the actual valve overlap rOVL never remains high during early stages of homogeneous-lean combustion mode, irrespective of the response delay in valve-timing adjustment (i.e., the response delay in valve-overlap adjustment). As can be appreciated from the timing charts shown in FIGS. 10D and 10F, the actual valve overlap rOVL is rapidly reduced to medium just before the second switch point $t_0$, owing to the earlier valve overlap switch timing ($t_1$). This prevents deterioration in combustion. Thereafter, when switching from the homogeneous-lean combustion mode to the homogeneous-stoichiometric combustion mode, the target overlap tOVL is quickly instantaneously switched from medium to low at the second switch timing $t_0$ (FLEAN 1→0) earlier than the actual combustion mode switch timing $t_2$ (FSTR2 1→0). In other words, during the transient switching period of time from the homogeneous-lean combustion mode to the homogeneous-stoichiometric combustion mode, the target valve overlap tOVL shifts from medium to low (see the flow from step S21 via step S23 to step S25) instantaneously at the time (the second switch point to) when the two necessary conditions of FSTR1≠FSTR2 and FLEAN=0 have been satisfied. On the other hand, the actual valve overlap rOVL tends to shift from medium to low with a slight time lag, resulting from the response delay in valve-timing adjustment of the variable valve timing control device 13. Due to the earlier switch timing ($t_0$), the actual valve overlap rOVL never remains medium during early stages of homogeneous-stoichiometric combustion mode, irrespective of the response delay in valve-timing adjustment (i.e., the response delay in valve-overlap adjustment). As can be appreciated from the timing charts shown in FIGS. 10D and 10F, the actual valve overlap rOVL is rapidly reduced to low just before the actual combustion mode switch timing $t_2$, owing to the earlier valve overlap switch timing ($t_0$). This prevents deterioration in combustion.

As can be appreciated from FIGS. 6, 9A–9G, and 10A–10G, according to the third valve overlap control routine, the switch timing from high to medium valve overlap is identical to the first switch timing (the first switch point) $t_1$ of occurrence of switching requirement between the ultra-lean-stratified combustion mode and the homogeneous-lean combustion mode. Similarly, the switch timing from medium to low valve overlap is identical to the second switch timing (the second switch point) $t_0$ of occurrence of switching requirement (FLEAN 1→0) from the homogeneous-lean combustion mode to the homogeneous-stoichiometric combustion mode. The overlap switch timing from low to medium is also identical to the second switch timing (the second switch point) $t_0$ of occurrence of switching requirement (FLEAN 0→1) from the homogeneous-stoichiometric combustion mode to the homogeneous-lean combustion mode. On the other hand, the overlap switching action from medium to high begins at the actual combustion mode switch timing $t_2$, retarded by a time delay $\Delta t$ (=$t_2$−$t_1$) from the first switch point $t_1$. Thus, during the transient switching period of time from homogeneous-lean to ultra-lean-stratified combustion mode, the actual overlap rOVL can be switched to high at the later valve overlap switch timing $t_2$ as compared to the first switch point $t_1$. Conversely, during the transient switching period of time from ultra-lean-stratified to homogeneous-lean combustion mode, the actual overlap rOVL can be switched quickly to medium at the earlier valve overlap switch timing $t_1$. In the same manner, during the transient switching period of time from homogeneous-lean to homogeneous-stoichiometric combustion mode, the actual overlap rOVL can be switched quickly to low at the earlier valve overlap switch timing $t_0$.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An in-cylinder direct-injection spark-ignition engine using at least a homogeneous combustion mode where early fuel-injection on intake stroke produces a homogeneous air-fuel mixture and a stratified combustion mode where late fuel-injection on compression stroke produces a stratified air-fuel mixture, comprising:

a variable valve overlap device mounted on at least one of intake and exhaust valves, for variably adjusting a valve overlap during which open periods of the intake and exhaust valves are overlapped; and a control unit connected to a fuel injector for switching between the homogeneous combustion mode and the stratified combustion mode, and connected to said variable valve overlap device for switching between a first valve overlap suitable for the homogeneous combustion mode and a second valve overlap suitable for the stratified combustion mode, wherein said control unit comprises an overlap switch timing control section for optimizing a switch timing of the valve overlap, so that a first timing of switching from the first valve overlap to the second valve overlap is different from a second timing of switching from the second valve overlap to the first valve overlap.

2. The in-cylinder direct-injection spark-ignition engine as claimed in claim 1, wherein said second timing is advanced in comparison with said first timing.

3. The in-cylinder direct-injection spark-ignition engine as claimed in claim 1, wherein said control unit comprises a target combustion mode setting section for setting a target combustion mode based on an engine operating condition, and a combustion mode switch timing decision section for determining an actual combustion mode switch timing ($t_2$) at which the combustion mode is actually switched from one of the homogeneous combustion mode and the stratified combustion mode to the other, said actual combustion mode switch timing being delayed by a delay time ($\Delta t$) from a target combustion mode switch timing ($t_1$) of setting of the target combustion mode, and wherein said overlap switch timing control section switches from the first valve overlap to the second valve overlap at the actual combustion mode switch timing ($t_2$) during switching from the homogeneous combustion mode to the stratified combustion mode, and switches from the second valve overlap to the first valve overlap at the target combustion mode switch timing ($t_1$) during switching from the stratified combustion mode to the homogeneous combustion mode.

4. The in-cylinder direct-injection spark-ignition engine as claimed in claim 1, wherein said control unit comprises a target combustion mode setting section for setting a target combustion mode based on an engine operating condition, and a combustion mode switch timing decision section for determining an actual combustion mode switch timing ($t_2$) at which the combustion mode is actually switched from one of the homogeneous combustion mode and the stratified combustion mode to the other, said actual combustion mode switch timing being delayed by a delay time ($\Delta t$) from a target combustion mode switch timing ($t_1$) of setting of the target combustion mode, and wherein said overlap switch timing control section switches from the first valve overlap to the second valve overlap, only when said target combustion mode is the stratified combustion mode and simultaneously an actual combustion mode, estimated by said actual combustion mode switch timing ($t_2$), is the stratified combustion mode, and wherein said overlap switch timing control section switches from the second valve overlap to the first valve overlap, except when both of said target combustion mode and said actual combustion mode are the stratified combustion mode.

5. The in-cylinder direct-injection spark-ignition engine as claimed in claim 1, wherein said control unit comprises a target combustion mode setting section (102) for setting a target combustion mode based on an engine operating condition, a basic equivalent ratio setting section (103) for setting a basic equivalent ratio (TFBYA0) based on the target combustion mode, a target equivalent ratio calculation section (104) for calculating a target equivalent ratio (TFBYA) by making a predetermined phase-lag processing to the basic equivalent ratio (TFBYA0), and a combustion mode switch timing decision section (105) for comparing the target equivalent ratio (TFBYA) to a predetermined threshold value and determining an actual combustion mode switch timing ($t_2$) at which the combustion mode is actually switched from one of the homogeneous combustion mode and the stratified combustion mode to the other, said actual combustion mode switch timing being delayed by a delay time ($\Delta t$) from a target combustion mode switch timing ($t_1$) of setting of the target combustion mode.

6. The in-cylinder direct-injection spark-ignition engine as claimed in claim 5, wherein the predetermined phase-lag processing to the basic equivalent ratio (TFBYA0) is a weighted-mean processing defined by TFBYA=M× TFBYA0+(1−M)×TFBYA, where M denotes a weighting factor of weighted mean.

7. The in-cylinder direct-injection spark-ignition engine as claimed in claim 5, wherein said overlap switch timing control section switches from the first valve overlap to the second valve overlap at the actual combustion mode switch timing ($t_2$) during switching from the homogeneous combustion mode to the stratified combustion mode, and switches from the second valve overlap to the first valve overlap at the target combustion mode switch timing ($t_1$) during switching from the stratified combustion mode to the homogeneous combustion mode.

8. The in-cylinder direct-injection spark-ignition engine as claimed in claim 5, wherein said overlap switch timing control section switches from the first valve overlap to the second valve overlap, only when said target combustion mode is the stratified combustion mode and simultaneously an actual combustion mode, estimated by said actual combustion mode switch timing ($t_2$), is the stratified combustion mode, and wherein said overlap switch timing control section switches from the second valve overlap to the first valve overlap, except when both of said target combustion mode and said actual combustion mode are the stratified combustion mode.

9. The in-cylinder direct-injection spark-ignition engine as claimed in claim 1, wherein the homogeneous combustion mode is further divided into a homogeneous stoichiometric combustion mode and a homogeneous lean combustion mode, and said control unit is connected to the fuel injector so that the combustion mode is switchable among the homogeneous stoichiometric combustion mode, the homogeneous lean combustion mode, and the stratified combustion mode, and connected to said variable valve overlap device so that the valve overlap is switchable among a first valve overlap suitable for the homogeneous stoichiometric combustion mode, a second valve overlap suitable for the stratified combustion mode, and a third valve overlap suitable for the homogeneous lean combustion mode.

10. The in-cylinder direct-injection spark-ignition engine as claimed in claim 9, wherein the first valve overlap is a low set value, the second valve overlap is a high set value, and the third valve overlap is a medium set value.

11. The in-cylinder direct-injection spark-ignition engine as claimed in claim 9, wherein the first valve overlap is a low value retrieved from a predetermined characteristic map for the homogeneous stoichiometric combustion mode, the second valve overlap is a high value retrieved from a predetermined characteristic map for the stratified combustion mode, and the third valve overlap is a medium value retrieved from a predetermined characteristic map for the homogeneous lean combustion mode, and the predetermined characteristic map for the homogeneous stoichiometric combustion mode, the predetermined characteristic map for the homogeneous lean combustion mode, and the predetermined characteristic map for the stratified combustion mode are different from each other.

12. An electronic control system for an in-cylinder direct-injection spark-ignition engine having a variable valve overlap device mounted on at least one of intake and exhaust valves for variably adjusting a valve overlap during which open periods of the intake and exhaust valves are overlapped, and using at least a homogeneous combustion mode where early fuel-injection on intake stroke produces a homogeneous air-fuel mixture and a stratified combustion mode where late fuel-injection on compression stroke produces a stratified air-fuel mixture, comprising:

a combustion mode switching means connected to a fuel injector for switching between the homogeneous combustion mode and the stratified combustion mode;

an overlap control means connected to said variable valve overlap device for switching between a first valve overlap suitable for the homogeneous combustion mode and a second valve overlap suitable for the stratified combustion mode; and an overlap switch timing control means for optimizing a switch timing of the valve overlap, so that a first timing of switching from the first valve overlap to the second valve overlap is different from a second timing of switching from the second valve overlap to the first valve overlap.

13. The electronic control system as claimed in claim 12, wherein the second valve overlap is greater than the first valve overlap, and wherein said combustion mode switching means comprises a target combustion mode setting section for setting a target combustion mode based on an engine operating condition, and a combustion mode switch timing decision section for determining an actual combustion mode switch timing ($t_2$) at which the combustion mode is actually switched from one of the homogeneous combustion mode and the stratified combustion mode to the other, said actual combustion mode switch timing being delayed by a delay time ($\Delta t$) from a target combustion mode switch timing ($t_1$) of setting of the target combustion mode, and wherein said overlap switch timing control means switches the valve overlap at the actual combustion mode switch timing ($t_2$) during switching from the first valve overlap to the second valve overlap, and switches the valve overlap at the target combustion mode switch timing ($t_1$) during switching from the second valve overlap to the first valve overlap.

14. The electronic control system as claimed in claim 12, wherein the second valve overlap is greater than the first valve overlap, and wherein said combustion mode switching means comprises a target combustion mode setting section for setting a target combustion mode based on an engine operating condition, and a combustion mode switch timing decision section for determining an actual combustion mode switch timing ($t_2$) at which the combustion mode is actually switched from one of the homogeneous combustion mode and the stratified combustion mode to the other, said actual combustion mode switch timing being delayed by a delay time ($\Delta t$) from a target combustion mode switch timing ($t_1$) of setting of the target combustion mode, and wherein said overlap switch timing control means switches the valve overlap to the second valve overlap, only when said target combustion mode is the stratified combustion mode and simultaneously an actual combustion mode, estimated by said actual combustion mode switch timing ($t_2$), is the stratified combustion mode, and wherein said overlap switch timing control means switches the valve overlap to the first valve overlap, except when both of said target combustion mode and said actual combustion mode are the stratified combustion mode.

15. The electronic control system as claimed in claim 12, wherein the homogeneous combustion mode is further divided into a homogeneous stoichiometric combustion mode and a homogeneous lean combustion mode, and said combustion mode switching means is connected to the fuel injector so that the combustion mode is switchable among the homogeneous stoichiometric combustion mode, the homogeneous lean combustion mode, and the stratified combustion mode, and said overlap control means is connected to said variable valve overlap device so that the valve overlap is switchable among a first valve overlap suitable for the homogeneous stoichiometric combustion mode, a second valve overlap suitable for the stratified combustion mode, and a third valve overlap suitable for the homogeneous lean combustion mode, said third valve overlap being higher than said first valve overlap and lower than second valve overlap.

16. An in-cylinder direct-injection spark-ignition engine using at least a homogeneous combustion mode where early fuel-injection on intake stroke produces a homogeneous air-fuel mixture and a stratified combustion mode where late fuel-injection on compression stroke produces a stratified air-fuel mixture, comprising:

a variable valve timing device mounted on at least one of intake and exhaust valves, for variably adjusting an opening timing of at least one of the intake and exhaust valves; and a control unit connected to a fuel injector for switching between the homogeneous combustion mode and the stratified combustion mode, and connected to said variable valve timing device for switching between a first valve timing used in the homogeneous combustion mode and a second valve timing used in the stratified combustion mode, wherein said control unit comprises a switch timing control section for optimizing a switch timing of the valve timing, so that a first timing of switching from the first valve timing to the second valve timing is different from a second timing of switching from the second valve timing to the first valve timing.

17. An electronic control method for an in-cylinder direct-injection spark-ignition engine having a variable valve timing device mounted on at least one of intake and exhaust valves for variably adjusting an opening timing of at least one of the intake and exhaust valves, and using at least a homogeneous combustion mode where early fuel-injection on intake stroke produces a homogeneous air-fuel mixture and a stratified combustion mode where late fuel-injection on compression stroke produces a stratified air-fuel mixture, comprising the steps of:

switching between the homogeneous combustion mode and the stratified combustion mode;

switching between a first valve timing used in the homogeneous combustion mode and a second valve timing used in the stratified combustion mode; and optimizing a switch timing of the valve timing, so that a first timing of switching from the first valve timing to the second valve timing is different from a second timing of switching from the second valve timing to the first valve timing.

* * * * *